July 27, 1937.   A. HUGUENIN   2,088,520
RAILWAY VEHICLE
Filed June 29, 1935   2 Sheets-Sheet 1
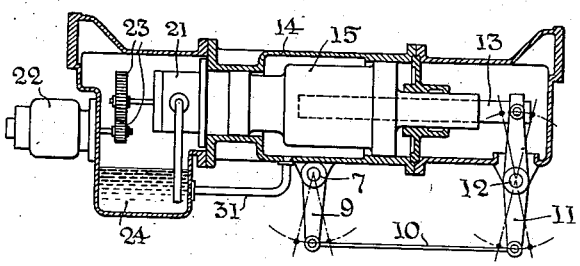
Fig. 1
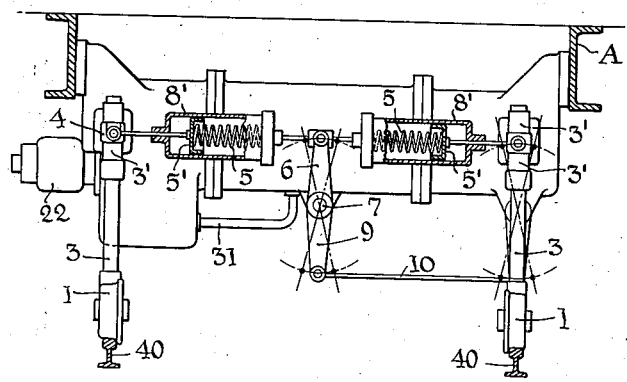
Fig. 2
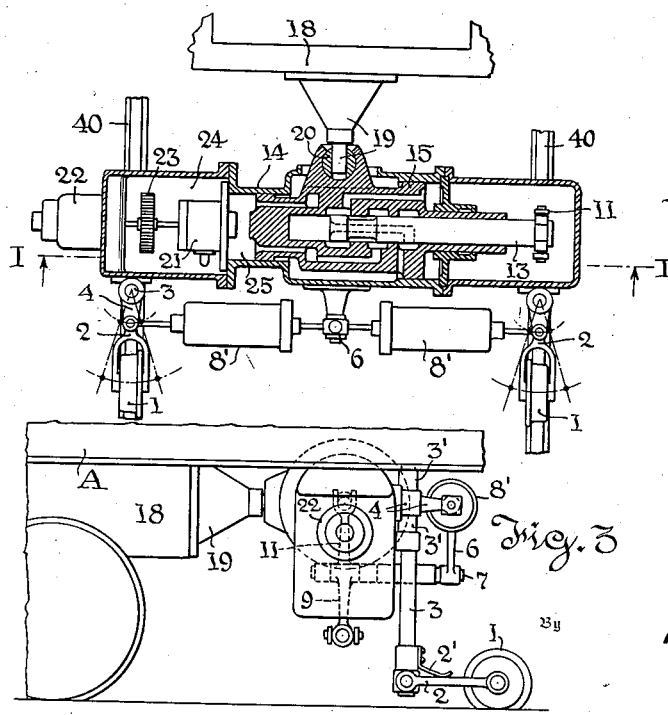
Fig. 4
Fig. 3
Inventor
Albert Huguenin
By
Attorneys July 27, 1937.  A. HUGUENIN  2,088,520
RAILWAY VEHICLE
Filed June 29, 1935  2 Sheets-Sheet 2
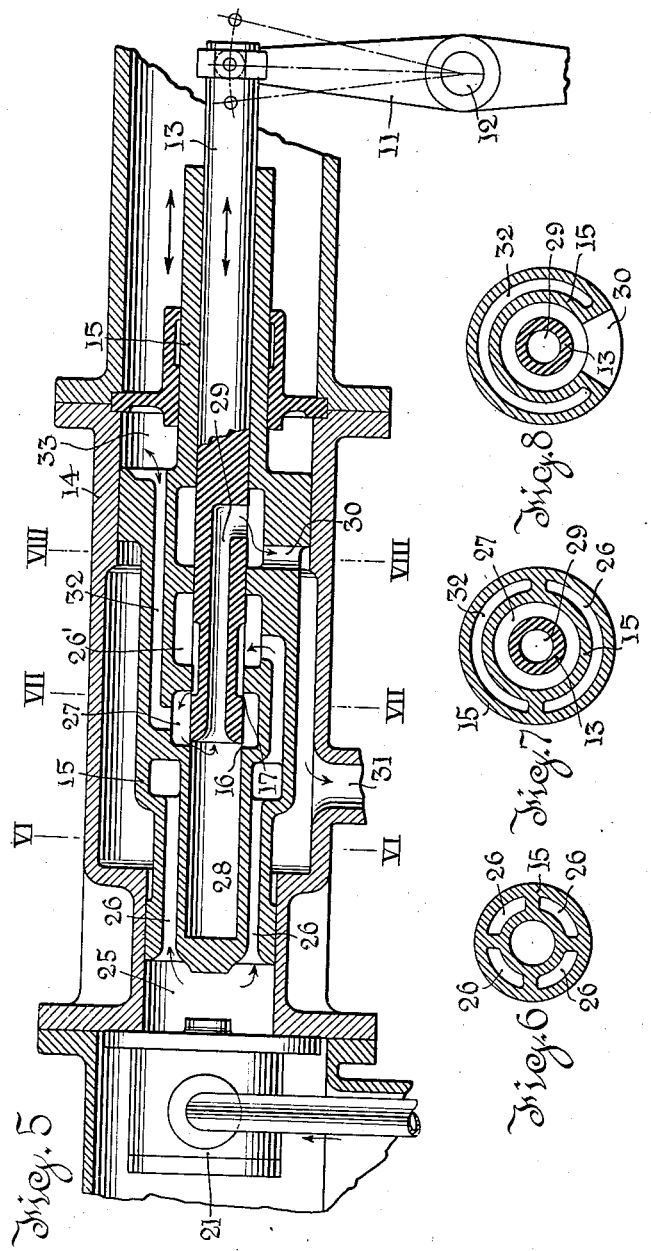
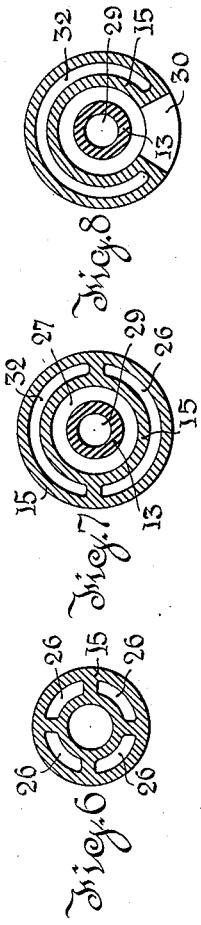
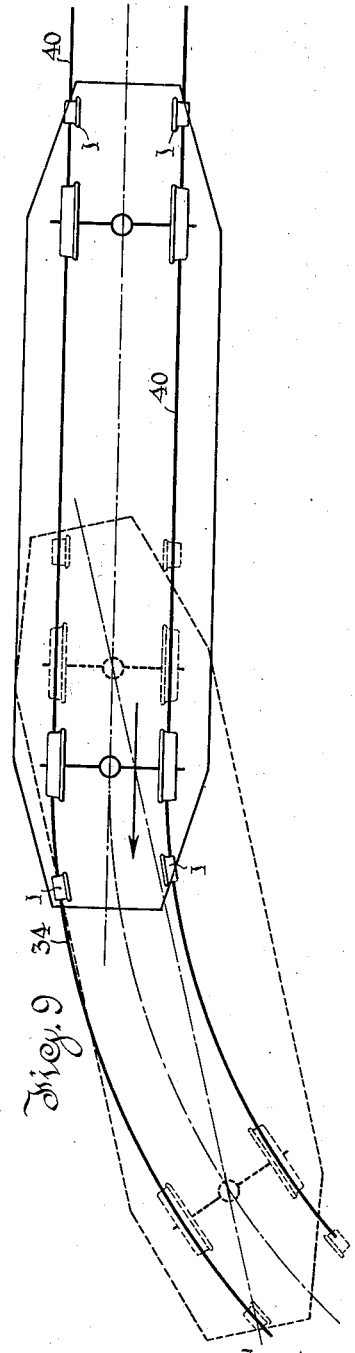
Inventor
Albert Huguenin
By
Attorneys Patented July 27, 1937

2,088,520

UNITED STATES PATENT OFFICE 2,088,520

RAILWAY VEHICLE

Albert Huguenin, Zurich, Switzerland

Application June 29, 1935, Serial No. 29,148
In Switzerland July 12, 1934

2 Claims. (Cl. 105—168)

This invention relates to railway vehicles, and particularly to means for steering bogies or single axles in response to curvature of the track.

Steering devices of this general class are already known, and it has even been proposed to displace the axles angularly about vertical axes for steering purposes in passing through curves, and even transition curves, by means of a servo-motor. Thus angular displacement is effected automatically and in a degree suited to the curvature of the track, so that the reactions between the wheel flanges and the rails are kept to a minimum.

Vehicle suspensions of this general type require that the vehicle frame be pivoted to the trucks on vertical axes on the center line of the frame. The trucks may be of the bogie type or of the single-axle (two wheeled) type.

The present invention relates to this class of devices and contemplates the use of an hydraulic servo-motor mounted on the vehicle frame, connected with the truck or trucks to steer the same, and controlled by feelers cooperating with the rails and laterally displaced by curvature thereof. The purpose of the invention is to ensure a rapid, powerful and accurate response of the servo-motor to the indications of the feelers.

In developing a satisfactory device of this class a number of factors must be taken into consideration. The spacing of a set of feelers from the truck whose angular position it controls is limited. Even if the feelers be located beneath the outermost end of the car frame, the distance cannot exceed the overhang of the car beyond the axle. From this limited spacing it follows that only a limited period of time is available for the performance of the steering function, and this period diminishes as vehicle speed increases. Consequently in order to secure satisfactory steering at high speeds and on relatively sharp curves, the response of the servo-motor to the indications of the feelers must be rapid and powerful.

To meet these requirements, it is necessary to adopt special designs for the connections between the servo-motor and its control valve, and these features are the principal subject-matter of the present invention. Important features are the mounting of the control valve within the servo-motor piston, the valve seat being formed in this piston, the construction of the valve and its seat in such a way that the valve has negative lap (clearance) on its controlling edges in the neutral position, and the use of flow passages of large cross section and short length, to the end that resistance to flow and consequent loss of pressure head on the hydraulic medium shall be low. Shortness of the flow passages is secured by the formation of these passages in the servo-motor piston and large cross section is secured by designing the passages to occupy the maximum portion of the cross section of the piston consistent with the provision of necessary wall thickness and necessary stiffening ribs.

Negative lap of the valve and the use of large, short, flow passages permit constant circulatory flow of the hydraulic medium, which causes a sharp temporary increase in the delivery pressure of the pump which develops the hydraulic pressure, whenever the valve is displaced from its neutral position with respect to the piston. This sharp increase in pressure entails instant and powerful response of the piston of the servo-motor, in shifting to reestablish the neutral relation between the piston and valve. In this way the requirement for rapid and precise response is met completely by the use of an extremely simple mechanism. The pump operates continuously under a moderate load, which increases momentarily when the position of the truck is being shifted.

An illustrative embodiment of the invention will now be described in connection with the accompanying drawings, in which,—

Fig. 1 is a vertical section on the line I—I of Fig. 4 showing the servo-motor and portions of its control mechanism.

Fig. 2 is an elevation looking from the end of the car with parts broken away to show the construction.

Fig. 3 is a side elevation showing portions of the truck and of the vehicle frame.

Fig. 4 is a plan view partly in section.

Fig. 5 is an enlarged vertical axial section through the servo-motor and its control valve.

Figs. 6, 7 and 8 are transverse sections taken, respectively, on the lines VI—VI, VII—VII and VIII—VIII of Fig. 5.

Fig. 9 is a diagram showing in plan the guiding around a curve of a railroad vehicle having two swiveled trucks, each equipped with a single axle.

The feelers take the form of two small rollers 1, and are mounted at each end of the vehicle, one pair for each of the two trucks. Each roller 1 is journaled in the end of a horizontal rod 2, which is hinged on a horizontal axis to the lower end of a corresponding vertical shaft 3, swiveled in bearings 3', fixed in relation to the vehicle frame A and illustrated as mounted in the housing of the servo-motor hereinafter described. Springs 2' urge the rods 2 downward to hold the rollers 1 in contact with the rail 40 despite upward and downward motion of the vehicle frame relatively to the rail (such motion being permitted by the usual spring suspension, not shown).

Lever arms 4 are fixed on the upper ends of shafts 3 and the two arms are each elastically connected to the upper end of a lever arm 6 by compression links each comprising a cylinder 8 with coacting piston 5' and an interposed coil compression spring 5. It follows that the arm 6 responds to the mean of the indications of the two related rollers 1. This arrangement ensures that the flanges on rollers 1 engage the rails continuously and also provides for the permissible variations in gage which on the continent of Europe may amount to 1 centimeter (gage limits being from 1435 to 1445 millimeters). The effect is to ensure prompt and accurate response under all conditions.

Lever arm 6 is fixed on a horizontal rock shaft, which carries fixed to it a second arm 9. Arm 9 is connected by link 10 to one arm of a two-armed lever 11 which is fulcrumed at 12. The other arm of lever 11 is operatively connected with the end of the control or pilot valve 13 of the servo-motor indicated generally by the numeral 14 applied to its housing.

A distinguishing characteristic of the control valve 13 is the negative lap (clearance) of its control edges 16 and 17 with respect to the coacting annular port 27 (see Fig. 5). Edge 16 controls discharge and edge 17 controls admission so that in neutral position admission and discharge passages are partially open.

The housing 14 of the servo-motor is rigidly secured to the frame A of the vehicle as shown and forms a cylinder for the piston 15, as clearly indicated in Fig. 5. The piston 15 is formed with a lug projecting through a slot in the cylinder 14 (see Fig. 4) and this lug has a ball and socket connection 20 with a projection 19 carried by the swiveled truck 18. Thus the truck will be turned by motion of the piston.

A pump 21 is mounted on the end of the servo-motor housing 14 and delivers the necessary hydraulic pressure fluid, preferably oil. The pump is driven by motor 22 through gearing 23, draws oil from a sump 24 (Fig. 1) and delivers it under pressure to the working space 25 in which the small end of piston 15 is exposed (see Fig. 5). From working space 25 the oil enters passage 26 in piston 15 (see Figs. 6 and 7) and is delivered to the annular chamber 26'.

With the parts in the neutral position of Fig. 5, the oil under pressure flows past the control edge 17 to annular chamber 27 and thence past control edge 16 to chamber 28 within piston 15. Chamber 28 is in constant free communication with sump 24 by way of axial bore 29 in valve 13, port 30 in piston 15, and passage 31. Chamber 27 is connected by passage 32 with working space 33 in which the other larger end of piston 15 is exposed. A tail sleeve through which valve 13 works reduces the effective area of this end of the piston, so that the effective areas of the two ends are properly coordinated.

Defining direction with reference to Fig. 5, the left end of piston 15 is exposed at all times to the discharge pressure developed by pump 21. This pressure is intensified if valve 13 moves to the right so that edge 17 throttles flow. The right end of piston 15 is subject to a pressure which varies as the result of changes of relative position of valve 13 and piston 15 causing variable throttling of supply at 17 with simultaneous inversely variable throttling of discharge at 16.

Obviously the piston 15 tends to follow the valve 13 and shifting of the valve after a neutral relation has been established produces sharp increases of effective pressure on the piston with attendant rapid response of the piston. Since chamber 28 is freely open to discharge, valve 13 is balanced. The channels 26, 32 and 29 are of large cross section and short length, so as to avoid pressure losses and ensure quick action.

The device operates as follows:

The valve 13 follows the mean indication of the two related rollers 1, remaining in its central position on straight track. In entering a curve the rollers 1 move laterally relatively to the car, shifting lever 6 and the connected valve 13. Piston 15 necessarily follows valve 13 and shifts the truck 18. Consequently, with reference to Figs. 4 and 5, the control valve 13 will be moved to the right. The result thereof is that the control edge 17 will be covered and the oil under pressure will be prevented from flowing out of the channels 26 into the annular channel 27 while oil under pressure may flow freely out of the chamber 33 past the control edge 16 through the channel 29 and the opening 30 to the discharge opening 31. Consequently, the delivery pressure of the pump 21 and the pressure in the chamber 25 undergo a temporary increase which ensures, in conjunction with the great volume delivered, a very sudden and rapid movement of the servo-motor piston 15 to the right. When the lever 6 is swung out to the left, the control valve 13 will move to the left and the edge 16 will be covered so that the pressure in the chamber 33 now undergoes an intermittent increase which results in a sudden rapid movement of the servo-motor piston 15 to the left.

If it be desired to guide two-axle bogies, an operative connection of the bogie frame (rotatable on a vertical axis) with the servo-motor piston 15, must be established in the same manner as described with reference to the axle frame 18, while the construction or design of the axle guide proper remains the same as hereindescribed.

What is claimed is,—

1. The combination of a railway vehicle comprising a frame mounted on trucks which have swiveled connection with said frame, said trucks including rail-engaging supporting wheels; at least one hydraulic servo-motor including a cylinder and coacting double-acting piston connected to turn a corresponding truck relatively to the vehicle frame, said piston being formed with supply and discharge flow passages for the hydraulic liquid, and a ported valve seat with the ports of which said passages communicate, said passages being characterized by short length and large cross sectional area; a pilot valve mounted in said valve seat, controlling the ports thereof and characterized by negative lap on a supply and a discharge port; a circulating pump arranged to supply pressure directly to said servo-motor; and a feeler mechanism mounted on said frame and coacting with the track to respond to curvature of the track, said feeler mechanism being connected to actuate said pilot valve.

2. The combination of a railway vehicle comprising a frame mounted on trucks which have swiveled connection with said frames, said trucks including rail-engaging supporting wheels; at least one hydraulic servo-motor including a cylinder and a coacting double-acting differential piston connected to turn a corresponding truck relatively to the vehicle frame, said piston being formed with a ported valve seat and short flow passages of large transverse area leading from each working space of the servo-motor to corresponding ports in said seat, and a discharge passage of large capacity; a balanced pilot valve in said seat and shiftable therein to throttle at relatively inverse rates communication between said working spaces and communication with said discharge passage, said valve being characterized by negative lap; a circulating pump for supplying liquid under pressure directly to the smaller working space; and a feeler mechanism mounted on said frame and coacting with the track to respond to curvature of the track, said feeler mechanism being connected to actuate said pilot valve.

ALBERT HUGUENIN.